United States Patent
Satomi

[11] Patent Number: 5,498,060
[45] Date of Patent: Mar. 12, 1996

[54] FLOOR FRAME SUPPORTING STRUCTURE FOR CONSTRUCTION MACHINES

[75] Inventor: Takeshi Satomi, Komatsu, Japan

[73] Assignee: Kabushiki Kaisha Komatsu Seisakusho, Tokyo, Japan

[21] Appl. No.: 255,405

[22] Filed: Jun. 8, 1994

[30] Foreign Application Priority Data

Jun. 11, 1993 [JP] Japan .................. 5-036823 U

[51] Int. Cl.6 ............................................. B62D 24/00
[52] U.S. Cl. ............................... 296/190; 296/35.1
[58] Field of Search ...................... 296/35.1, 190; 180/89.12–89.16

[56] References Cited

U.S. PATENT DOCUMENTS

| | | | |
|---|---|---|---|
| 3,420,568 | 1/1969 | Henriksson et al. | 296/35.1 |
| 3,985,385 | 10/1976 | Kennicutt et al. | 296/35.1 |
| 4,135,757 | 1/1979 | Smith et al. | 296/35.1 |
| 4,265,328 | 5/1981 | Rowa et al. | 296/190 |
| 4,638,878 | 1/1987 | Komp | 296/190 |
| 5,024,283 | 6/1991 | Deli | 296/35.1 |

FOREIGN PATENT DOCUMENTS

| | | |
|---|---|---|
| 60-148368 | 10/1985 | Japan . |
| 62-185761 | 11/1987 | Japan . |
| 2-45881 | 3/1990 | Japan . |
| 93/09302 | 5/1993 | WIPO . |

*Primary Examiner*—Dean Kramer
*Attorney, Agent, or Firm*—Richards, Medlock & Andrews

[57] ABSTRACT

A floor frame supporting structure for an operator cabin on a construction vehicle, which is capable of absorbing vibration and large shock loads and of preventing rolling of the operator cabin and which has a simple construction, includes buffer support members (10L, 10R) which connect bearings (13) clamped at a front right side portion and a front left side portion of a floor frame (2) of the operator cabin (1), and joint members (11L, 11R) which are movably clamped to brackets (4L, 4R) fixed to the vehicle frame (3). A rear right side portion and a rear left side portion of the floor frame (2) are supported by rubber mount viscous dampers (20L, 20R) which are mounted on brackets (5L and 5R) fixed to the vehicle frame (3). The mounted positions of the rubber mount viscous dampers are approximately as high as the center of gravity of the operator cabin. Vibrations in a regular run are absorbed by the rubber bushings of the buffer support members (10L, 10R) and the rubber members of the multi-layer rubber mount viscous dampers (20L, 20R), and a shock load, such as when the construction vehicle runs over an obstruction, is absorbed by a pitching motion around the shafts (15L, 15R).

24 Claims, 10 Drawing Sheets

FLOOR FRAME SUPPORTING STRUCTURE FOR CONSTRUCTION MACHINES

FIELD OF THE INVENTION

The present invention relates to an improvement in a structure for supporting a floor frame of an operator cabin on a construction machine, for example, a bulldozer.

BACKGROUND OF THE INVENTION

Construction machines, particularly bulldozers, are mainly used in earth work on irregular ground. Therefore, the bodies of construction machines are subject to large vibrations during movement, and as a result the operators suffer from substantial fatigue. For this reason, it is desirable, wherever possible, to relieve the effects of the machine vibrations on the operators.

Figure 14:
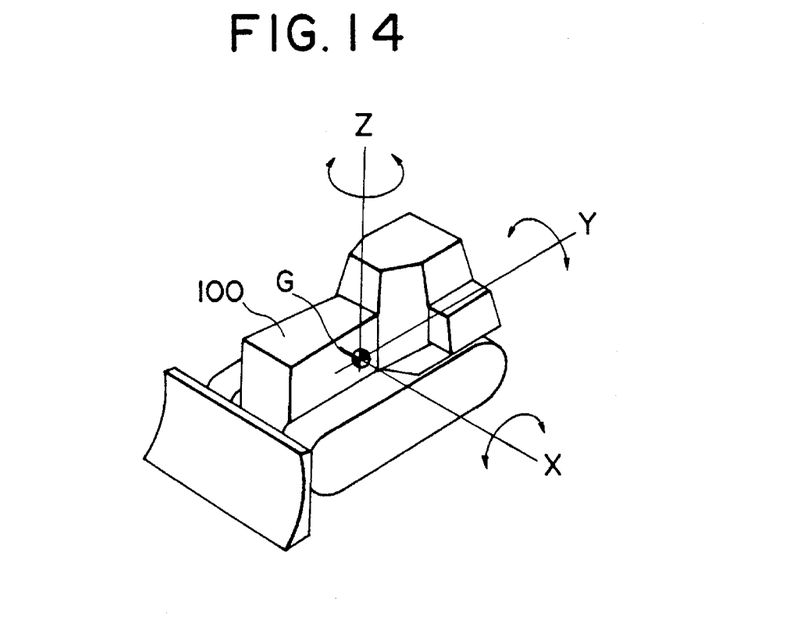
FIG. 14 is an illustration of a vibration mode of a bulldozer.

As shown in FIG. 14, a body vibration mode of a bulldozer is such that a horizontal transversal axis X, a horizontal longitudinal axis Y, and a vertical axis Z, all of which pass through the center of gravity G of a bulldozer 100, denote pitching, rolling, and yawing, respectively.

Figure 15:
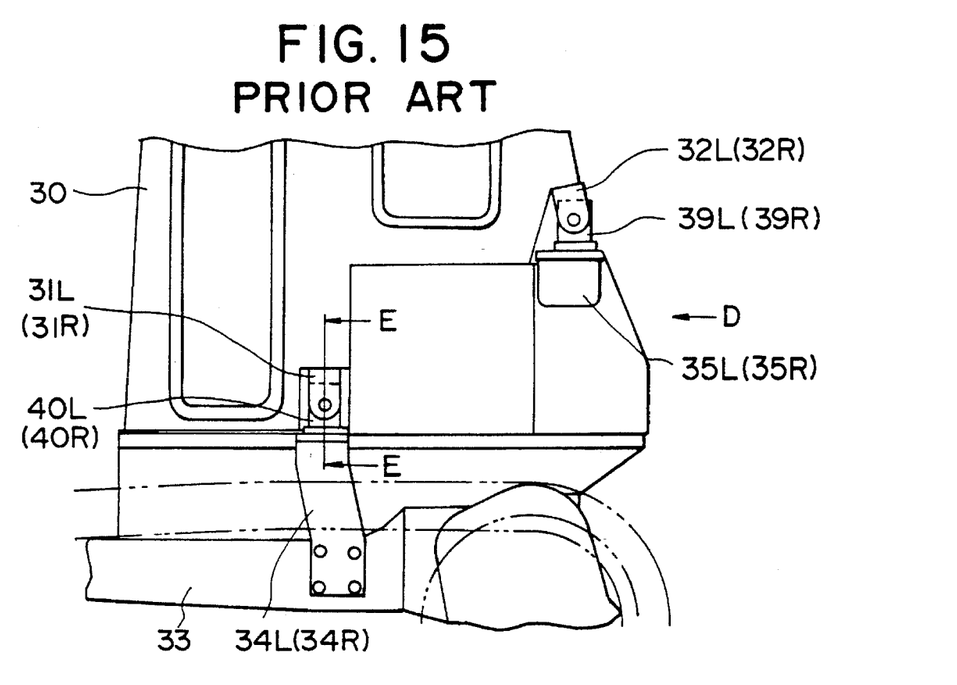
FIG. 15 is a partial side view of a rubber mount system for a cabin floor frame according to the related art.
Figure 16:
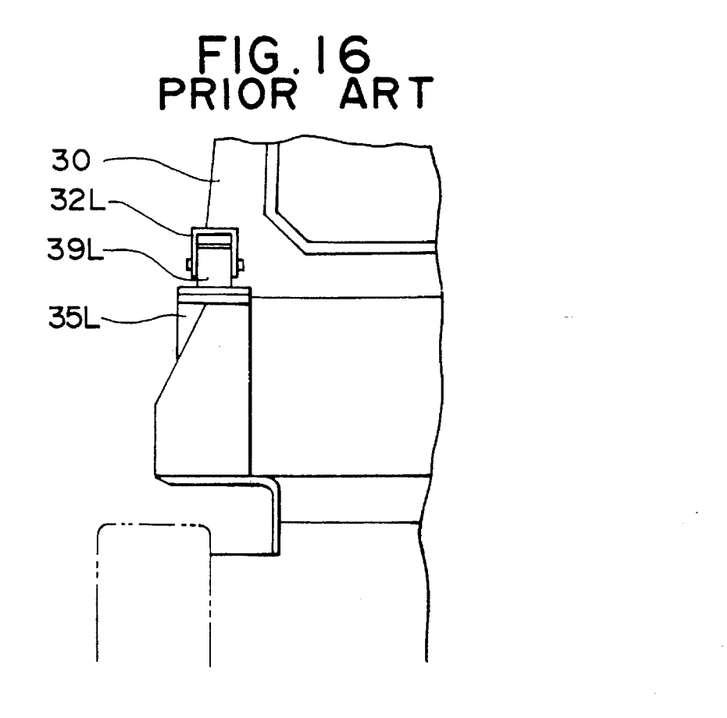
FIG. 16 is a partial rear view of the structure of FIG. 15.

FIG. 15 is a partial side view illustrating a floor frame supporting structure for an operator cabin on a conventional bulldozer, and FIG. 16 is a rear view as viewed in the direction of arrow D in FIG. 15. Brackets 31L and 31R are provided at the front left portion and the front right portion, respectively, of the operator cabin 30, while brackets 32L and 32R are provided at the rear left portion and rear right portion, respectively, of the operator cabin 30. The front brackets 31L and 31R are coupled to rubber mounts 40L and 40R which are mounted on the brackets 34L and 34R, which in turn are fixed to a front part of the vehicle body frame 33. The rear brackets 32L and 32R are coupled to rubber mounts 39L and 39R which are mounted on brackets 35L and 35R, which in turn are fixed to a rear part of the vehicle frame 33.

Figure 17:
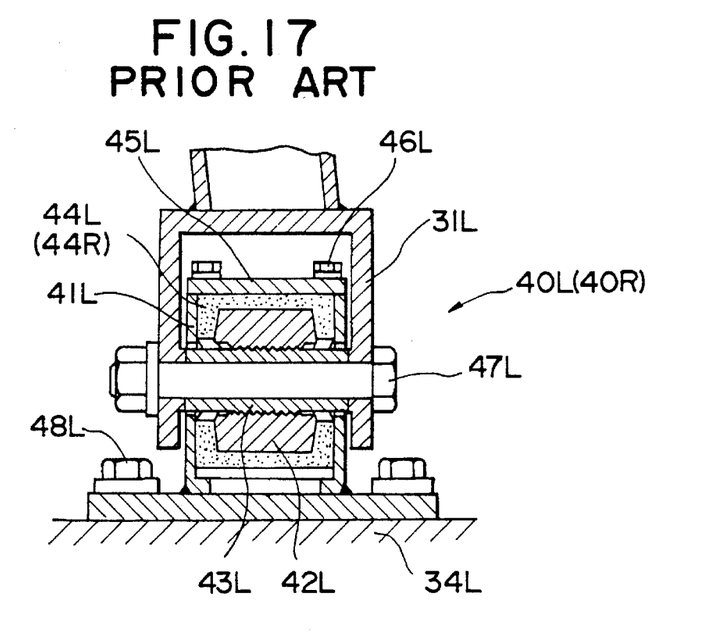
FIG. 17 is an enlarged sectional view of a rubber mount in FIG. 17.

FIG. 17 is a sectional view of the front left side rubber mount 40L, taken along sectional line E—E in FIG. 15. The construction of the front right side rubber mount 40R and that of the rear right side and rear left side rubber mounts 39R and 39L is the same as that of the front left side rubber mount 40L. A block 42L, in which a pipe 43L is closely mounted, is encased in a rubber member 44L which is housed in a case 41L, and a cover 45L is clamped to the case 41L by bolts 46L, thus forming the rubber mount 40L. The case 41L is clamped to a vehicle body frame bracket 34L by bolts 48L, and is pivotally coupled with a bracket 31L on the operator cabin 30 by a bolt 47L which is positioned concentrically within pipe 43L and extends through the opposite walls of cabin bracket 31L. The vibration of the machine body is absorbed by the deflection of the rubber member 44L and its counterparts in the other rubber mounts 39R, 39L, and 40R.

The above supporting member involves a problem in that, since a vibration of the machine body is absorbed only by deflection of the rubber members 44 in the rubber mounts 39L, 39R, 40L, and 40R, a vibration due to a large shock, such as is caused when the machine vehicle runs over an obstruction, cannot be sufficiently absorbed.

Figure 18:
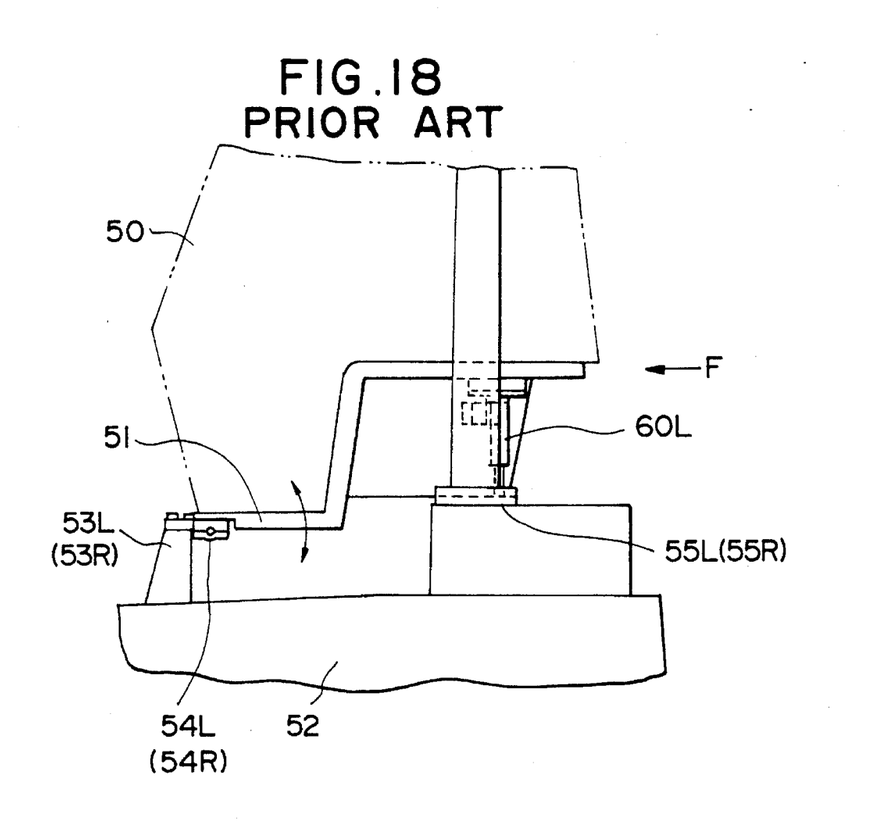
FIG. 18 is a side view of a rubber mount and suspension cylinder system according to the related art.
Figure 19:
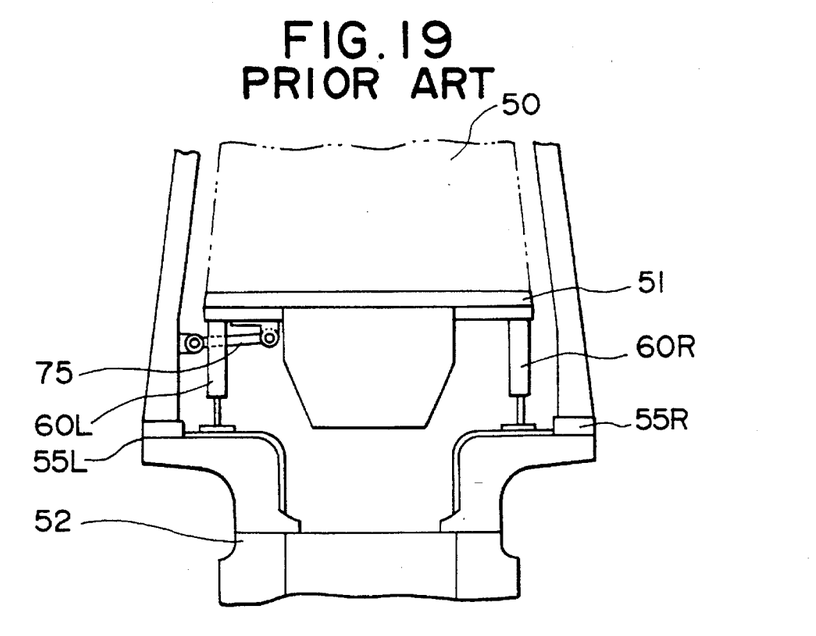
FIG. 19 is a rear view of the structure of FIG. 18.

Therefore, a supporting structure as shown in FIGS. 18 and 19 has been contrived. Specifically, a front right side portion and a front left side portion of the floor frame 51 of the operator cabin 50 are secured to pins 54L and 54R, respectively, which are pivotally mounted by rubber bushings in brackets 53L and 53R, which are fixed to the vehicle body frame 52. A rear left side portion and a rear right side portion of the floor frame 51 are coupled by suspension cylinders 60L and 60R, respectively, to brackets 55L and 55R, which are fixed to the vehicle body frame 52.

Figure 20:
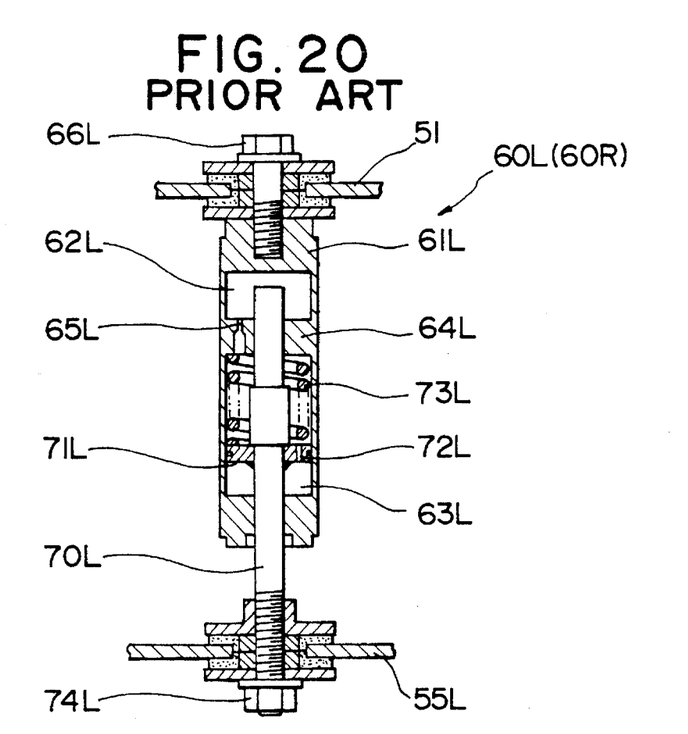
FIG. 20 is an enlarged sectional view of a suspension cylinder in FIG. 18.

FIG. 20 is an enlarged sectional view of the rear left side suspension cylinder 60L, the rear right side suspension cylinder 60R having the same construction. A cylinder body 61L has an upper chamber 62L and a lower chamber 63L, which are separated by a partition 64L having an orifice 65L such that the orifice 65L provides restricted communication between the two chambers. The chambers 62L and 63L are sealed with oil. A piston 71L is fixed to a rod 70L and is inserted into the lower chamber 63L for reciprocating movement therein along the longitudinal axis of the lower chamber 63L. The piston 71L is provided with an orifice 72L which provides restricted fluid communication between the portions of lower chamber 63L on opposite sides of the piston 71L. A spring 73L is positioned about the rod 70L between the piston 71L and the partition 64L to resiliently bias the piston 71L downwardly. The cylinder body 61L is clamped to the cabin floor 51 by a bolt 66L, while the distal end of the rod 70L is clamped to a first rear body frame bracket 55L by a nut 74L.

The spring 73L in the suspension cylinder 60L supports the left rear part of the operator cabin 50 at a steady state condition in which a sufficient stroke of the piston 71L is reserved. When a vertical load is applied, oil in the lower chamber 63L above the piston 71L is pressurized and a portion of the pressurized oil is forced through the orifices 65L and 72L to produce a damper effect. Accordingly, when a large load is applied to the machine vehicle in the vertical direction, the operator cabin 50 pitches around the longitudinal axis of pins 54L and 54R, as shown by the double headed arrow in FIG. 18, thereby absorbing vibration. Rolling in the horizontal direction is prevented by using the shackle rod 75 to couple the bracket 55L, which is fixed to the vehicle frame 52, and the floor frame 51, with the shackle rod 75 being pivotally mounted at both ends, as shown in FIG. 19.

This supporting structure sufficiently absorbs even a large shock load, such as is caused when the machine vehicle runs over an obstruction, and also prevents rolling of the cabin. However, this supporting structure involves a problem in that the construction is complex due to a large number of components and is expensive.

SUMMARY OF THE INVENTION

An object of the present invention, made to solve a problem as described above, is to provide a floor frame supporting structure for a construction machine, with the floor frame supporting structure being capable of absorbing vibrations and large shock loads and of preventing the rolling of the operator cabin, and having a simple and inexpensive construction.

In a supporting structure for coupling the four corner portions of a floor frame of an operator cabin to a vehicle body frame with shock absorbing support members according to the present invention, both right and left sides of the front part of the floor frame are supported by pivotable buffer supporting members, and both right and left sides of the rear part of the floor frame are supported by shock absorbing support members which are installed at positions approximately as high as the height of the center of gravity of the operator cabin.

Each pivotable buffer support member is provided with a pivot shaft, which allows pitching of the operator cabin, and a rubber bushing which absorbs vibrations. Each rear shock absorbing support member comprises a rubber mount which absorbs vibrations, with these rear rubber mounts being installed at positions approximately as high as the height of the center of gravity of the operator cabin. At least one rolling limiting mechanism can be provided for the rear portion of the operator cabin to limit rolling of the operator cabin. The rolling limiting mechanism can be a shackle bar with rubber cushions which resiliently couples the floor frame of the operator cabin to a fixed portion of the vehicle body frame. Alternatively, the rolling limiting mechanism can be provided by combining a rolling preventing liquid damper with one or both of the rear rubber mounts.

Each of the rear shock absorbing support members can be a damping plate shock absorber comprising a guide shaft joined through an elastic material to a case, with one of the guide shaft and the case being tightly attached to the frame and the other of the guide shaft and the case being secured to the operator cabin. One end of the guide shaft is tightly attached to one of the frame and the operator cabin, while the other end of the guide shaft is provided with a damper plate tightly attached thereto. The damper plate is positioned within a highly viscous fluid hermetically contained in a fluid enclosing chamber in the nose of the case.

Where the front part of the floor frame of the operator cabin is pivoted to allow pitching of the operator cabin via the buffer support members, each of which is provided with a rubber bushing, and the rear part is supported with rubber mounts and is provided with a rolling limiting mechanism, such configuration absorbs pitching movement and rolling vibration when a large load is applied to the construction machine in the vertical direction. In addition, such configuration employing a rear rubber mount provided with a rolling preventing mechanism can reduce yawing.

DETAILED DESCRIPTION

A floor frame supporting structure for construction machines according to a first embodiment of the present invention is described below with reference to FIGS. 1 to 5.

Figure 1:
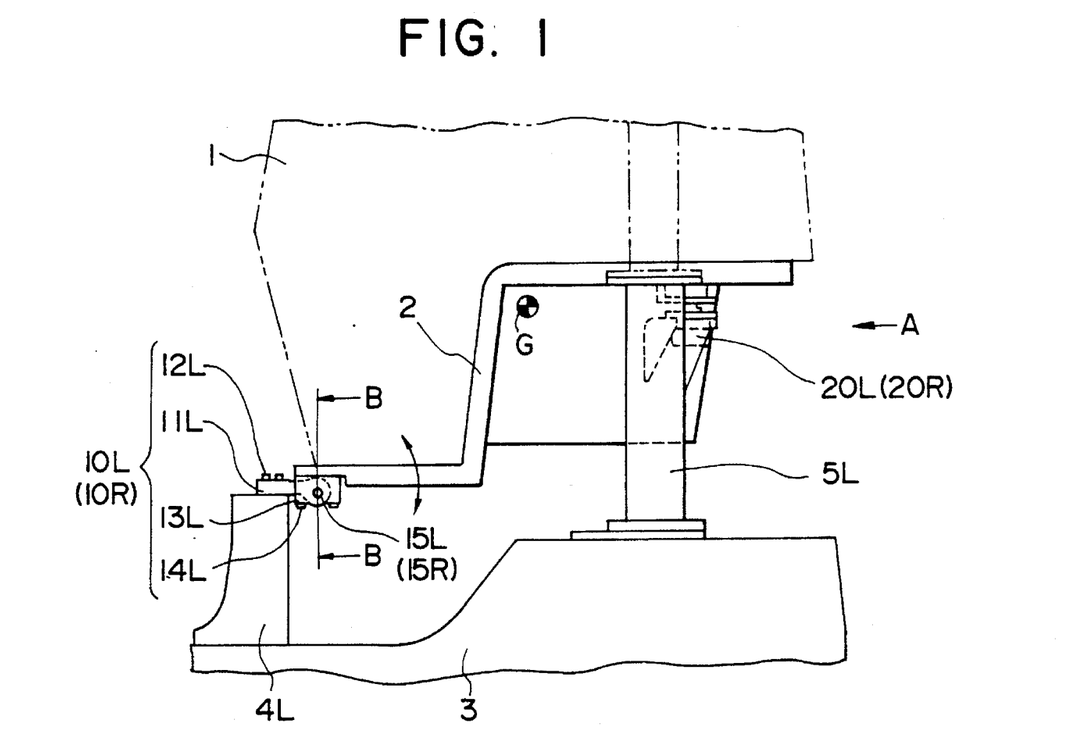
FIG. 1 is a side view of a cabin floor frame supporting structure in accordance with a first embodiment of the present invention.
Figure 4:
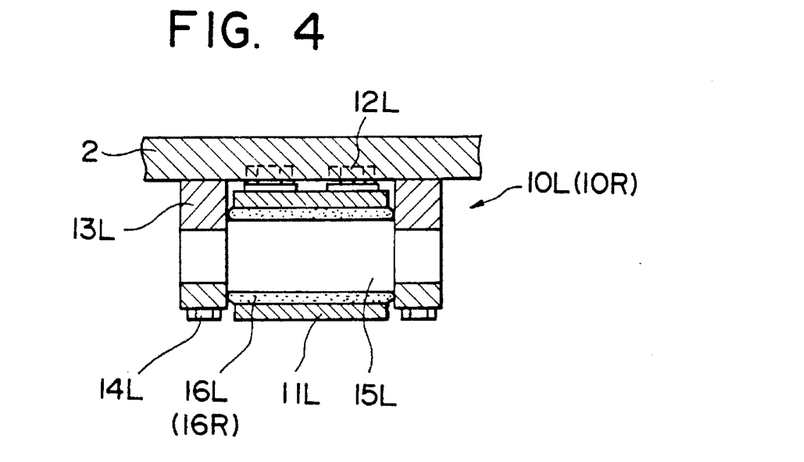
FIG. 4 is an enlarged sectional view of a buffer support member for supporting a front part of the floor frame of FIG. 1.

A front left side portion and a front right side portion of a floor frame 2 of an operator cabin 1 are coupled to brackets 4L and 4R, respectively, by buffer support members 10L and 10R to allow pitching of the operator cabin 1. The vertically extending brackets 4L and 4R are fixed to a vehicle body frame 3. As shown in FIG. 4, each of the buffer support members 10L, 10R comprises a joint member 11L, 11R, a bearing 13L, 13R, a pivot shaft 15L, 15R, and a rubber bushing 16L, 16R. As shown in FIG. 1, each joint member 11L, 11R has a tubular portion and a flange portion with the flange portion being secured to the vehicle body frame bracket 4L, 4R by bolts 12L, 12R, while the bearing 13L, 13R is clamped to the cabin floor frame 2 by bolts 14L, 14R. The pivot shaft 15L, 15R is mounted coaxially within and separated from the tubular portion of the joint member 11L, 11R by the rubber bushing 16L, 16R. The bearing 13L, 13R can be pivoted about the longitudinal axis of pivot shaft 15L, 15R and joint member 11L, 11R, so as to provide relative rotational movement of the bearing 13L, 13R and the cabin 1 with respect to the joint member 11L, 11R and the vehicle body frame 3.

Figure 2:
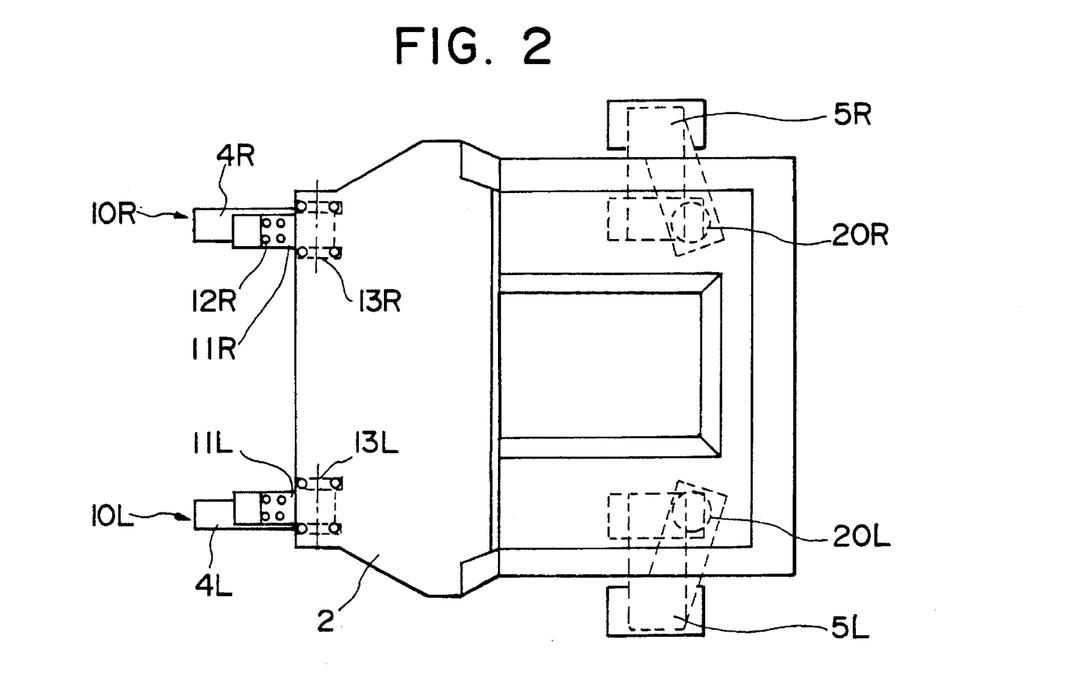
FIG. 2 is a plan view of the structure of FIG. 1.
Figure 3:
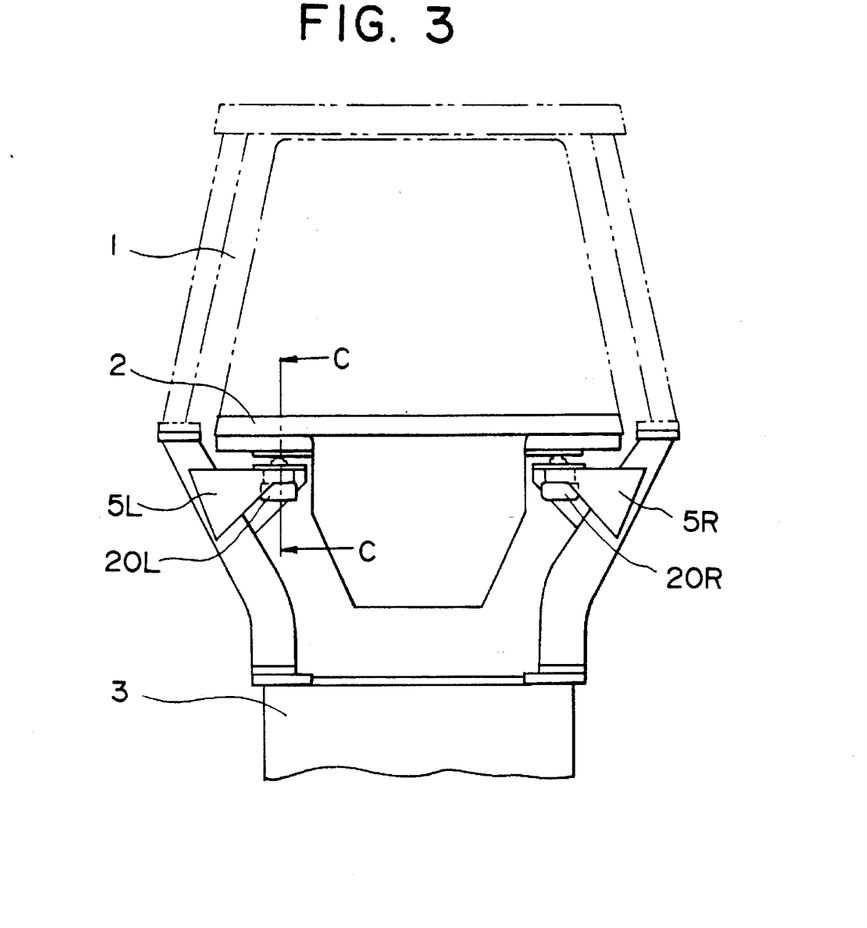
FIG. 3 is a rear view of the structure of FIG. 1.

A rear left side portion and a rear right side portion of the floor frame 2 are supported by multi-layer rubber mount viscous dampers 20L and 20R mounted on brackets 5L and 5R, respectively. Brackets 5L and 5R are fixed to the vehicle body frame 3. The multi-layer rubber mount viscous dampers 20L and 20R are shock absorbing restrictive members, that is, rubber mounts sealed with a yawing preventing liquid, and are located on the vehicle at positions approximately as high as the center of gravity G of the operator cabin 1.

Figure 5:
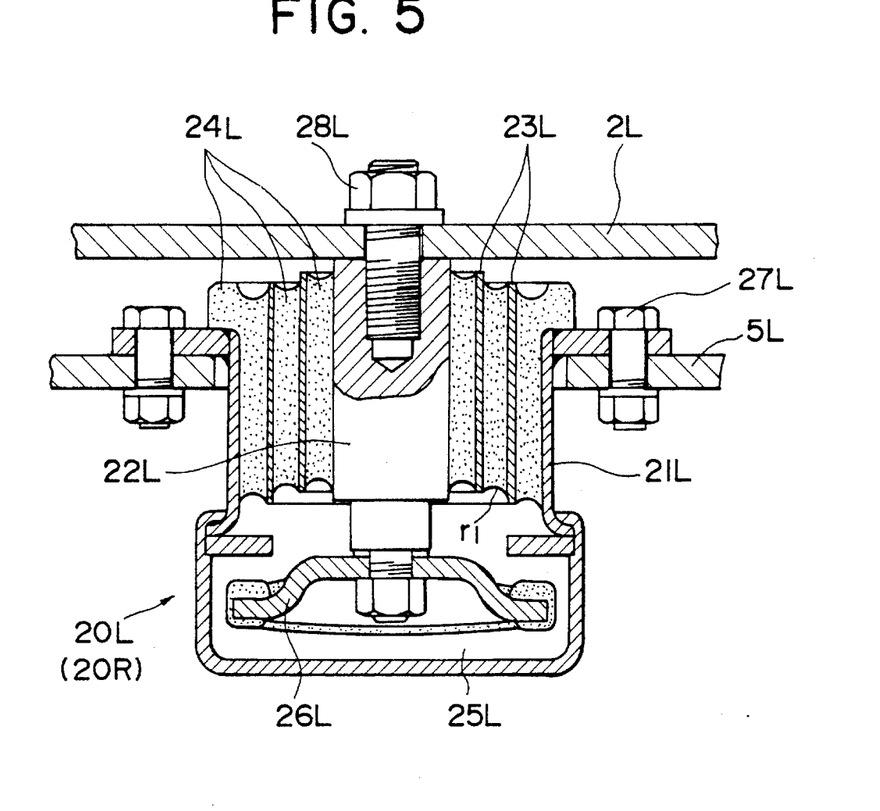
FIG. 5 is an enlarged sectional view of a multi-layer rubber mount viscous damper for supporting a rear part of the floor frame of FIG. 1.

FIG. 5 shows a sectional view of the left side rubber mount viscous damper 20L taken along the sectional line C—C in FIG. 3. The right side rubber mount viscous damper 20R can have the same construction as the left side rubber mount viscous damper 20L. A guide shaft 22L is positioned within and coaxially to a generally cylindrical tubular case 21L. The exterior surface of the guide shaft 22L is coupled to the interior surface of the case 21L by a plurality of concentrically positioned generally tubular rubber cushions 24L with a plurality of concentrically positioned tubular plates 23L interleaved between the tubular rubber cushions 24L such that the two cylindrical surfaces of each tubular plate 23L are at least substantially in full contact with confronting surfaces of an adjacent pair of tubular rubber cushions 24L. The plates 23L are made of a relatively rigid material so as to increase the effective area of the tubular rubber cushions 24L under compression during a lateral movement of the operator cabin 1. The case 21L is secured to the bracket 5L by bolts 27L, while the guide shaft 22L is clamped to the floor frame 2 by a bolt 28L.

A chamber 25L is formed in the rubber mount viscous damper 20L below the case 21L, and is filled with a damper oil. A damper plate 26L is mounted to and below a lower end portion of the guide shaft 22L and is positioned within the highly viscous damper oil in chamber 25L. Therefore, a spring constant in the vertical direction is small, and an amount of displacement is large. Moreover, the highly viscous fluid in chamber 25L has a damper effect owing to its resistance to the movement of damper plate 26L resulting from a shock load. On the other hand, the spring constant in the horizontal direction is large, and an amount of deformation is small.

The following describes a case where a large shock is applied to the construction machine vehicle when it runs over an obstruction. Although the operator cabin 1 pitches around the longitudinal axis of shafts 15L and 15R of the buffer support members 10L and 10R as shown with a double headed arrow in FIG. 1, the rear part of the floor frame 2 can absorb vibration sufficiently since it is supported by the multi-layer rubber mount viscous dampers 20L and 20R. The amount of displacement in any horizontal direction is small; therefore, the yawing of the operator cabin 1 is prevented. The multi-layer rubber mount viscous dampers 20L and 20R, which are located at positions approximately as high as the center of gravity G of the operator cabin 1, reduce the rolling of the operator cabin 1.

A second embodiment of the invention is described with reference to FIGS. 6 to 12. Those components which are the same as in the first embodiment are given the same reference numerals and symbols and the description thereof is not repeated.

Figure 6:
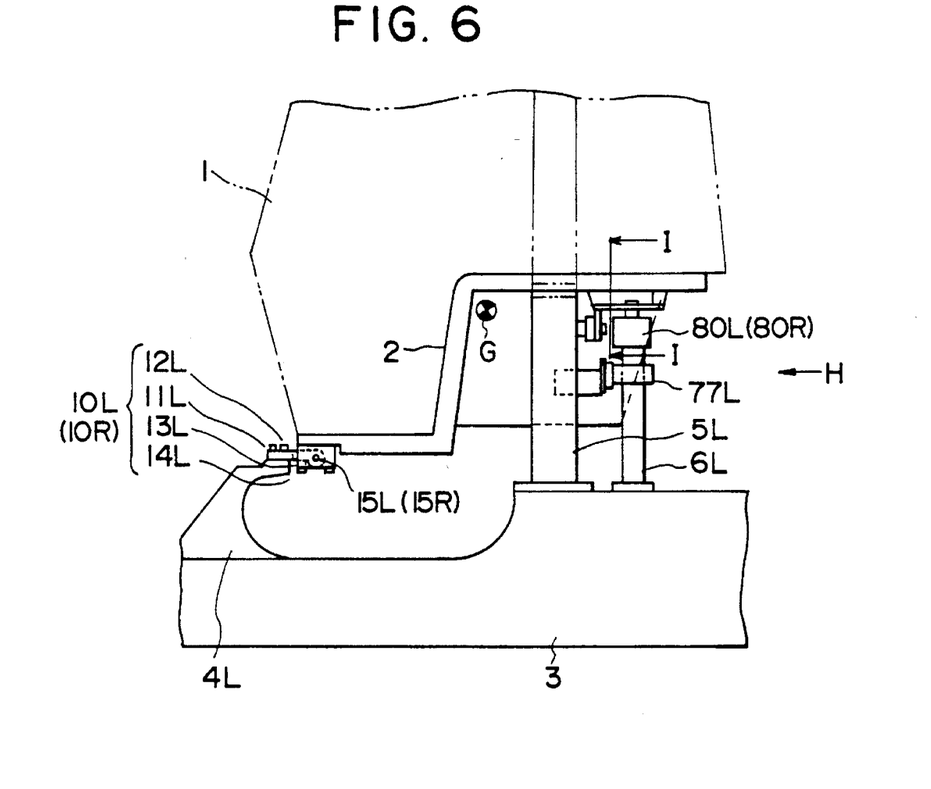
FIG. 6 is a side view of a floor frame supporting structure in accordance with a second embodiment of the present invention.
Figure 7:
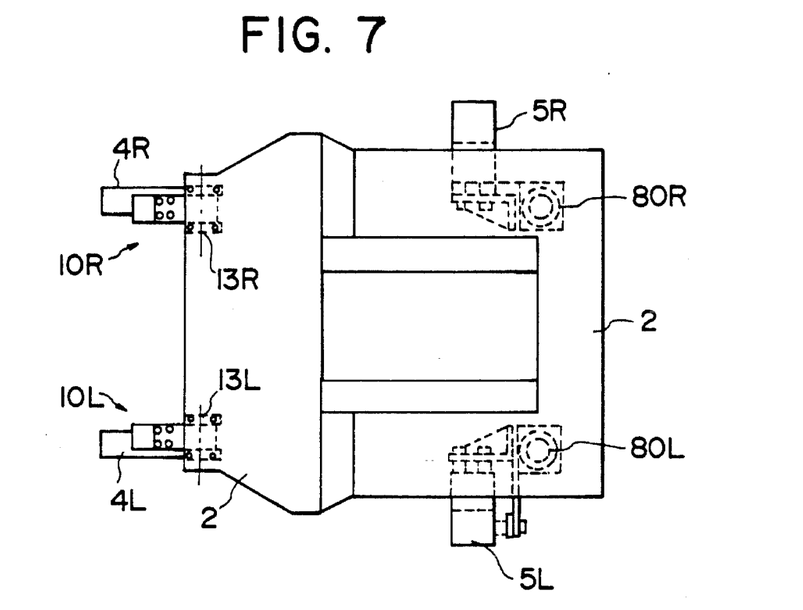
FIG. 7 is a plan view of the structure of FIG. 6.
Figure 8:
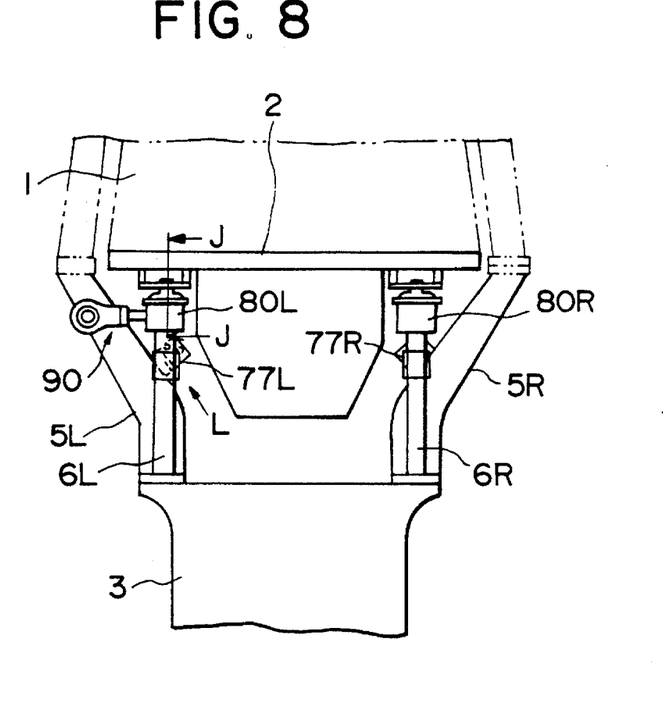
FIG. 8 is a rear view of the structure of FIG. 6.

A rear left side portion and a rear right side portion of the floor frame 2 are supported by single-layer rubber mount viscous dampers 80L and 80R, respectively, which are liquid-sealed single layer rubber mounts fixed at the upper ends of damper supporting brackets 6L and 6R. The damper supporting brackets 6L and 6R are given additional support by bracing brackets 77L and 77R which extend generally horizontally and are clamped to the generally vertically extending brackets 5L and 5R, which are fixed to the vehicle frame 3. The rear left side portion of the floor frame 2 can be coupled to the bracket 5L by the movable shackle bar 90 which has rubber cushions, with one end of the shackle bar 90 being pivotally connected to the rear left side portion of the floor frame 2 and the other end of the shackle bar 90 being pivotally connected to the bracket 5L. Alternatively, the shackle bar 90 can be mounted between the right rear side portion of the floor frame 2 and the bracket 5R. The height of the single-layer rubber mount viscous dampers 80L and 80R and the height of the joint 90 are approximately as high as the center of gravity G of the operator cabin 1 in order to enhance the restriction of the vibration of the operator cabin 1.

Figure 10:
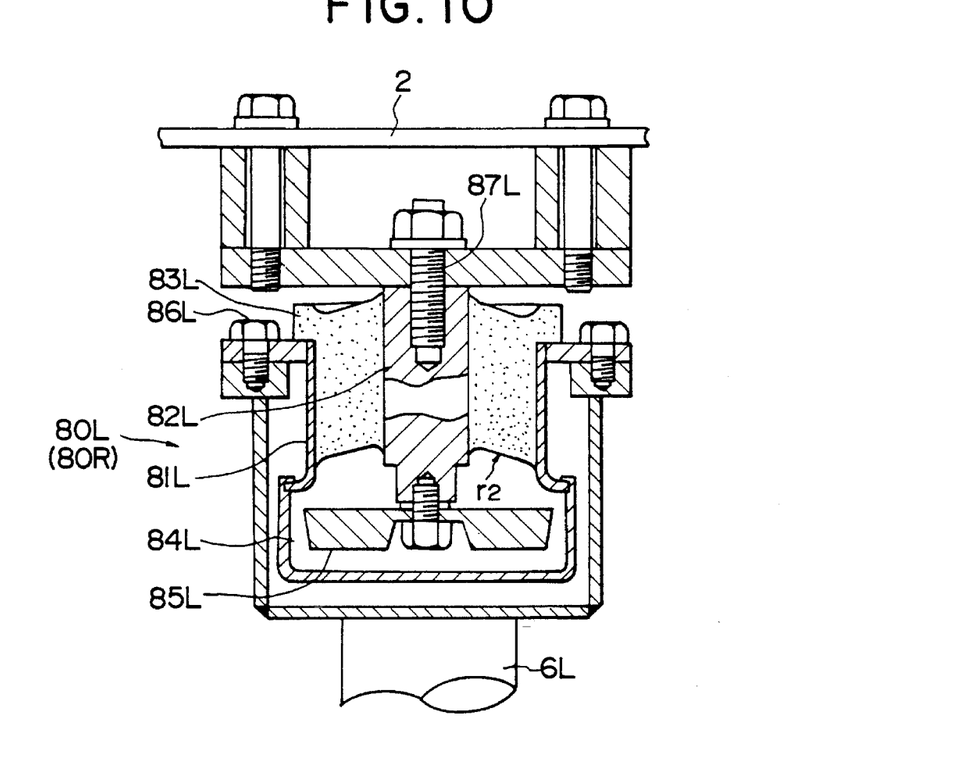
FIG. 10 is an enlarged sectional view of a single-layer rubber mount viscous damper for supporting a rear part of the floor frame of FIG. 6.

FIG. 10 is an enlarged sectional view of the left side single-layer rubber mount viscous damper 80L, taken along the sectional line J—J in FIG. 8. The right side single-layer rubber mount viscous damper 80R can have the same construction as the left side single-layer rubber mount viscous damper 80L. A guide shaft 82L is mounted within and coaxially with a generally cylindrical tubular case 81L. The guide shaft 82L and the case 81L are directly coupled by a single tubular rubber cushion 83L which contacts the exterior surface of the shaft 82L and the interior surface of the case 81L. The case 81L is mounted on the damper supporting bracket 6L by bolts 86L, while the guide shaft 82L is secured to the floor frame 2 by a bolt 87L.

A fluid enclosing chamber 84L is formed below the case 81L and a highly viscous damper oil is hermetically contained in the chamber 84L. A damper plate 85L, which is mounted to and below a lower end portion of the guide shaft 82L, is positioned in the damper oil in chamber 84L. The single-layer rubber mount viscous damper 80L contains a larger amount of rubber than the multi-layer rubber mount viscous damper 20L of the first embodiment, since the former is not provided with the multiple plates 23L. Therefore, in the vertical, longitudinal and transversal directions, the spring constants are small and the amounts of displacement are large.

A single-layer rubber mount 83L of the second embodiment avoids concentration of stresses and retards the occurrence of cracks, since the radius of curvature r2 of the single-layer rubber 83L in the second embodiment can be larger than the radius of curvature r1 of each rubber layer 24L of the first embodiment, as shown in FIGS. 5 and 10.

Figure 11:
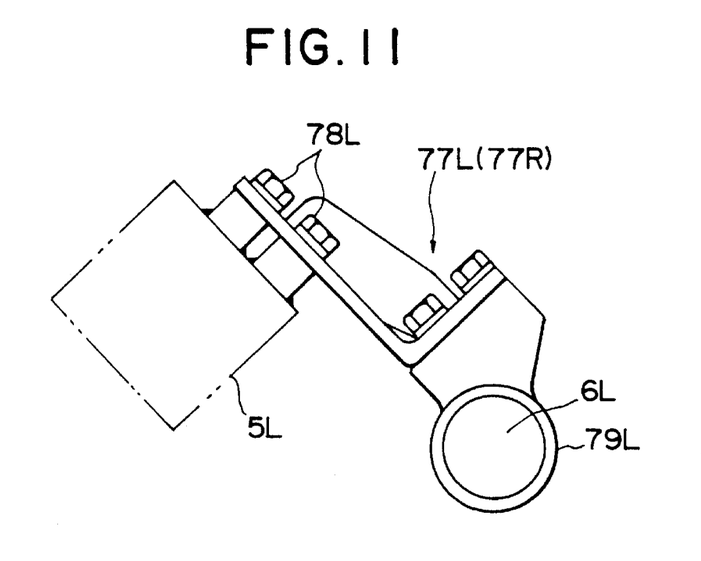
FIG. 11 is an enlarged diagram of a bracing bracket, taken in the direction of the arrow L in FIG. 8.

FIG. 11, taken along the direction of the arrow L in FIG. 8, illustrates details of the left side bracing bracket 77L. The right side bracing bracket 77R can have the same construction as the left side bracing bracket 77L. One end of the bracing bracket 77L is clamped to the generally vertically extending bracket 5L by a bolt 78L, while the other end of the bracing bracket 77L is in the form of a tubular sleeve 79L of sufficient length to surround and support the damper support bracket 6L at its upper end to prevent vibration in the longitudinal and transversal directions.

Figure 9:
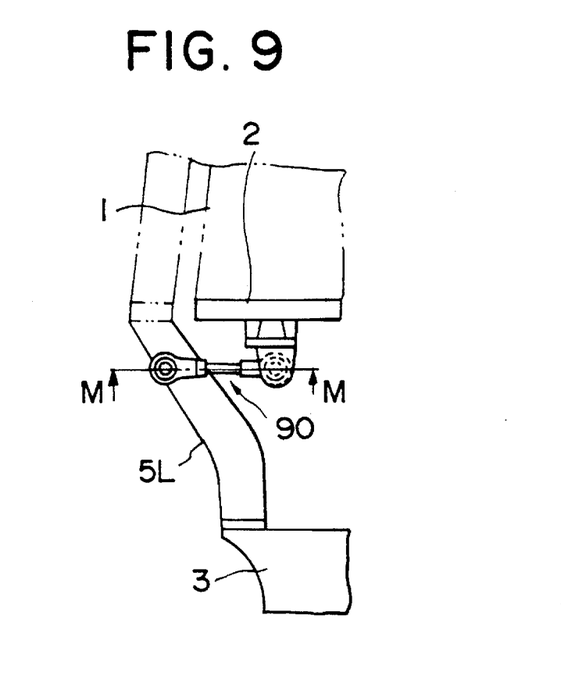
FIG. 9 is a detail view taken along line I—I in FIG. 6.
Figure 12:
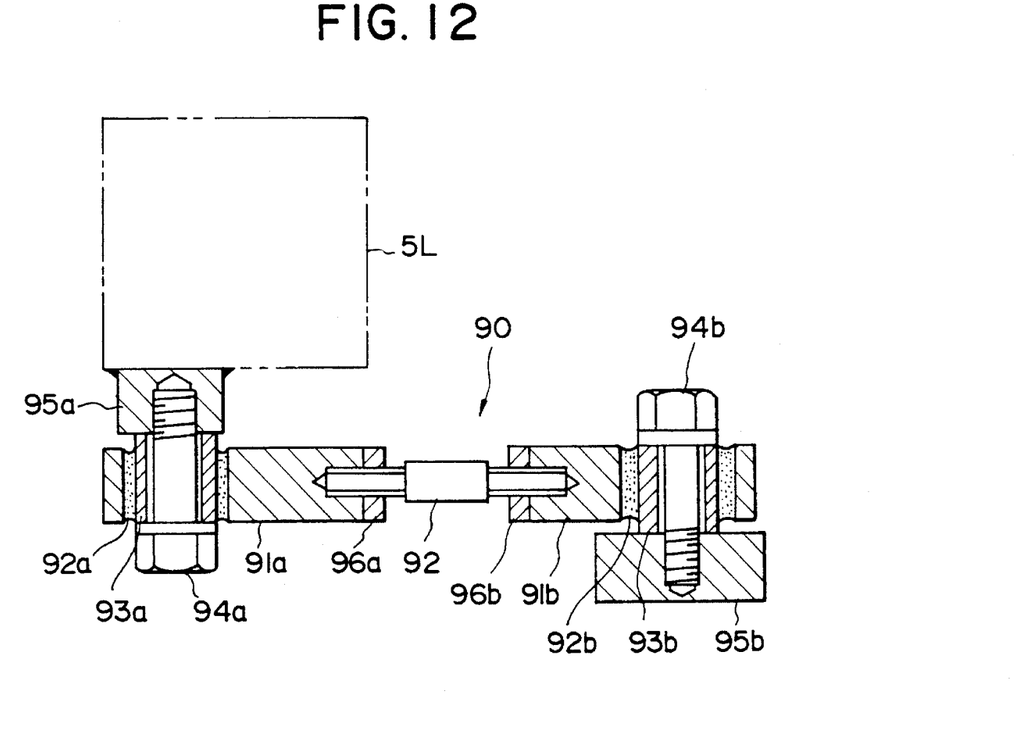
FIG. 12 is an enlarged sectional view of a movable shackle bar having rubber cushions, taken along section line M—M in FIG. 9.

FIG. 12 is a sectional view of the shackle bar 90 taken along the sectional line M—M in FIG. 9. Confronting ends 96a and 96b of eyelets 91a and 91b are provided with internally threaded holes to receive the end portions of a rod 92 provided with external threads, whereby the length of the shackle bar 90 can be adjusted. The distal end portion of each of eyelets 91a and 91b has a cylindrical hole extending therethrough. A rubber cushion layer 92a is formed on the outer periphery of a tubular bushing 93a and the thus coated bushing is positioned within and coaxially to the cylindrical hole in eyelet 91a. Similarly, a rubber cushion layer 92b is formed on the outer periphery of a tubular bushing 93b and the thus coated bushing is positioned within and coaxially to the cylindrical hole in eyelet 91b. A bolt 94a is inserted through the bushing 93a so as to clamp the bushing 93a to a plate 95a which is welded to the bracket 5L. A bolt 94b is inserted through the bushing 93b so as to clamp the bushing 93b to a plate 95b which is welded to the floor frame 2. The thickness of each of rubber cushion layers 92a and 92b can be sufficient to provide a force fit of the coated bushing in the respective eyelet, while permitting some movement of the eyelets 91a, 91b with respect to the bushings 93a, 93b.

Figure 13:
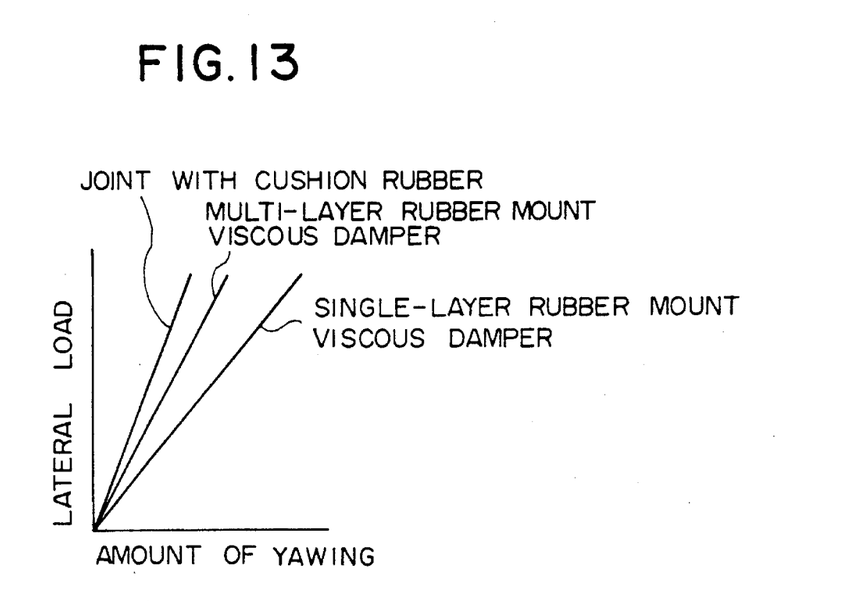
FIG. 13 is a graph showing a relationship between a lateral load and an amount of yawing.

FIG. 13 is a graph showing the relationship of lateral loads and the resulting amounts of yawing in a first case where the rear part of the floor frame 2 is supported by the single-layer rubber mount viscous dampers 80L and 80R, in a second case where the rear part of the floor frame 2 is supported by the multi-layer rubber mount viscous dampers 20L and 20R, and in a third case where the rear part of the floor frame 2 is supported by the single-layer rubber mount viscous dampers 80L and 80R and is coupled by the shackle bar 90 to the vehicle frame. The amount of yawing in the first case, where the rear part of the floor frame 2 is supported by the single-layer rubber mount viscous dampers 80L and 80R, is larger than that in the second case, where it is supported by the multilayer rubber mount viscous dampers 20L and 20R. However, the amount of yawing in the third case, where the rear part of the floor frame 2 is supported by the single-layer rubber mount viscous dampers 80L and 80R and is coupled to the vehicle frame by the shackle bar 90 having the rubber cushions, is even smaller than that in the second case, where it is supported by the multi-layer rubber mount viscous dampers 20L and 20R. Accordingly, the amount of yawing of the supporting structure according to the second embodiment with a combination of the shackle bar 90 with the rubber cushions and the single-layer rubber mount viscous dampers 80L and 80R is smaller than that of the supporting structure according to the first embodiment using the multi-layer rubber mount viscous dampers 20L and 20R.

Reasonable variations and modifications are possible within the scope of the foregoing description, the drawings and the appended claims to the invention. For example, the rubber members can be formed of any suitable resilient material other than rubber. An additional front mount could be located at the center portion of the front portion of the cabin. Similarly, the front mounts could be mounted between lateral extensions of the cabin and the frame rather than directly under the cabin floor.

What is claimed is:

1. A structure for supporting a cabin on a vehicle body and for absorbing and dampening vibrations traveling from the vehicle body to the cabin, wherein the traveling from the vehicle body to the cabin, wherein the cabin has a floor frame and the vehicle body has a vehicle body frame on which the cabin is to be supported, said structure comprising:

a left pivotable buffer support member having a first pivot shaft for pivotally coupling a left front portion of the floor frame to the vehicle body frame, a right pivotable buffer support member having a second pivot shaft for pivotally coupling a right front portion of the floor frame to the vehicle body frame, a left rear shock absorbing support member for supporting a left rear portion of the floor frame on the vehicle body frame, and a right rear shock absorbing support member for supporting a right rear portion of the floor frame on the vehicle body frame, wherein said left and right rear shock absorbing support members are located at positions which are approximately as high as the height of the center of gravity of the cabin, wherein each of said left rear shock absorbing support member and said right rear shock absorbing support member is a damping plate shock absorber and comprises a guide shaft joined to a case through an elastic material, said guide shaft having first and second ends, one of the case and the first end of the guide shaft being secured to the vehicle body frame with the other of the case and the first end of the guide shaft being secured to the cabin, the second end of the guide shaft having a damper plate attached thereto, the damper plate being contained in a highly viscous fluid in a fluid enclosing chamber in the case, and wherein said left buffer support member, said right buffer support member, said left rear shock absorbing support member, and said right rear shock absorbing support first and second pivot shafts while said left rear shock absorbing support member and said right rear shock absorbing support member absorb such pitching movement.

2. A structure in accordance with claim 1, wherein each of said pivotable buffer support members is provided with a first member for mounting the respective pivot shaft, a second member for rotation about the longitudinal axis of the respective pivot shaft, a resilient bushing surrounding the respective pivot shaft and positioned between the respective pivot shaft and the second member for absorbing vibrations, one of said first and second members being secured to the floor frame and the other of said first and second members being secured to the vehicle body frame.

3. A structure in accordance with claim 2, further comprising a shackle bar having a first end connected to the floor frame through a resilient cushion and a second end connected to the vehicle body frame through a resilient cushion so as to limit yawing of the cabin.

4. A structure in accordance with claim 2, wherein said case is a generally tubular case which is positioned coaxially with said guide shaft, and wherein an exterior surface of said guide shaft is joined to an interior surface of said case by a plurality of concentrically positioned generally tubular rubber cushions with a plurality of concentrically positioned tubular plates interleaved between the tubular rubber cushions such that two cylindrical surfaces of each tubular plate are at least substantially in full contact with confronting surfaces of an adjacent pair of tubular rubber cushions.

5. A structure in accordance with claim 2, wherein said case is a generally tubular case which is positioned coaxially with said guide shaft, and wherein an exterior surface of said guide shaft is joined to an interior surface of said case by a single concentrically positioned generally tubular rubber cushion.

6. A structure in accordance with claim 5, wherein each of the rear shock absorbing support members is supported on a generally vertically extending bracket which is secured to the vehicle body frame, and further comprising first and second bracing brackets, each of said bracing brackets being connected between an upper portion of a respective generally vertically extending bracket and the vehicle body frame to support the generally vertically extending bracket at its upper end so as to prevent vibration in the longitudinal and transversal directions.

7. A structure in accordance with claim 5, further comprising a shackle bar having a first end connected to the floor frame through a resilient cushion and a second end connected to the vehicle body frame through a resilient cushion so as to limit yawing of the cabin.

8. A structure in accordance with claim 7, wherein said shackle bar has first and second ends with an opening through each of said first and second ends, wherein each of the resilient cushions is a tubular bushing having a rubber coating on an exterior surface thereof, each thus coated bushing being concentrically positioned within a respective one of the openings, a bolt extending through one of the bushings to pivotally secure the first end of the shackle bar to the vehicle body frame, and a bolt extending through the other bushing to pivotally secure the second end of the shackle bar to the floor frame.

9. A structure in accordance with claim 1, further comprising a shackle bar having a first end connected to the floor frame through a resilient cushion and a second end connected to the vehicle body frame through a resilient cushion so as to limit yawing of the cabin.

10. A structure in accordance with claim 9, wherein said shackle bar has first and second ends with an opening through each of said first and second ends, wherein each of the resilient cushions is a tubular bushing having a rubber coating on an exterior surface thereof, each thus coated bushing being concentrically positioned within a respective one of the openings, a bolt extending through one of the bushings to pivotally secure the first end of the shackle bar to the vehicle body frame, and a bolt extending through the other bushing to pivotally secure the second end of the shackle bar to the floor frame.

11. A structure in accordance with claim 1, wherein each of said pivotable buffer support members is provided with a bearing for mounting the respective pivot shaft, a joint member for rotation about the longitudinal axis of the respective pivot shaft, an elastic bushing surrounding the respective pivot shaft and positioned between the respective pivot shaft and the joint member for absorbing vibrations, said bearing being secured to the floor frame and said joint member being secured to a bracket on the vehicle body frame.

12. A structure in accordance with claim 11, wherein said elastic bushing is a rubber bushing, and wherein said elastic material comprises rubber.

13. A structure in accordance with claim 11, wherein said case is a generally tubular case which is positioned coaxially with said guide shaft, and wherein an exterior surface of said guide shaft is joined to an interior surface of said case by a single concentrically positioned generally tubular rubber cushion.

14. A structure in accordance with claim 13, further comprising a shackle bar having a first end connected to the floor frame through a resilient cushion and a second end connected to the vehicle body frame through a resilient cushion so as to limit yawing of the cabin.

15. A structure in accordance with claim 14, wherein said shackle bar has first and second ends with an opening through each of said first and second ends, wherein each of the resilient cushions is a tubular bushing having a rubber coating on an exterior surface thereof, each thus coated bushing being concentrically positioned within a respective one of the openings, a bolt extending through one of the bushings to pivotally secure the first end of the shackle bar to the vehicle body frame, and a bolt extending through the other bushing to pivotally secure the second end of the shackle bar to the floor frame.

16. A structure in accordance with claim 13, wherein each of the rear shock absorbing support members is supported on a generally vertically extending bracket which is secured to the vehicle body frame, and further comprising first and second bracing brackets, each of said bracing brackets being connected between an upper portion of a respective generally vertically extending bracket and the vehicle body frame to support the generally vertically extending bracket at its upper end so as to prevent vibration in the longitudinal and transversal directions.

17. A structure in accordance with claim 1, wherein each of the rear shock absorbing support members is supported on a generally vertically extending bracket which is secured to the vehicle body frame, and further comprising first and second bracing brackets, each of said bracing brackets being connected between an upper portion of a respective generally vertically extending bracket and the vehicle body frame to support the generally vertically extending bracket at its upper end so as to prevent vibration in the longitudinal and transversal directions.

18. A structure in accordance with claim 1, wherein said case is a generally tubular case which is positioned coaxially with said guide shaft, and wherein an exterior surface of said guide shaft is joined to an interior surface of said case by a plurality of concentrically positioned generally tubular rubber cushions with a plurality of concentrically positioned tubular plates interleaved between the tubular rubber cushions such that two cylindrical surfaces of each tubular plate are at least substantially in full contact with confronting surfaces of an adjacent pair of tubular rubber cushions.

19. A structure in accordance with claim 1, wherein said case is a generally tubular case which is positioned coaxially with said guide shaft, and wherein an exterior surface of said guide shaft is joined to an interior surface of said case by a single concentrically positioned generally tubular rubber cushion.

20. A structure in accordance with claim 19, wherein each of the rear shock absorbing support members is supported on a generally vertically extending bracket which is secured to the vehicle body frame, and further comprising first and second bracing brackets, each of said bracing brackets being connected between an upper portion of a respective generally vertically extending bracket and the vehicle body frame to support the generally vertically extending bracket at its upper end so as to prevent vibration in the longitudinal and transversal directions.

21. A structure in accordance with claim 19, further comprising a shackle bar having a first end connected to the floor frame through a resilient cushion and a second end connected to the vehicle body frame through a resilient cushion so as to limit yawing of the cabin.

22. A structure in accordance with claim 21, wherein said shackle bar has first and second ends with an opening through each of said first and second ends, wherein each of the resilient cushions is a tubular bushing having a rubber coating on an exterior surface thereof, each thus coated bushing being concentrically positioned within a respective one of the openings, a bolt extending through one of the bushings to pivotally secure the first end of the shackle bar to the vehicle body frame, and a bolt extending through the other bushing to pivotally secure the second end of the shackle bar to the floor frame.

23. A structure for supporting a cabin on a vehicle body and for absorbing and dampening vibrations traveling from the vehicle body to the cabin, wherein the cabin has a floor frame and the vehicle body has a vehicle body frame on which the cabin is to be supported, said structure comprising:

a left pivotable buffer support member for pivotally coupling a left front portion of the floor frame to the vehicle body frame, a right pivotable buffer support member for pivotally coupling a right front portion of the floor frame to the vehicle body frame, a left rear shock absorbing support member for supporting a left rear portion of the floor frame on the vehicle body frame, and a right rear shock absorbing support member for supporting a right rear portion of the floor frame on the vehicle body frame, wherein said left and right rear shock absorbing support members are located at positions which are approximately as high as the height of the center of gravity of the cabin, wherein each of said pivotable buffer support members is provided with a pivot shaft to allow pitching of the cabin about a longitudinal axis of the pivot shaft, a bearing for mounting the pivot shaft, a joint member for rotation about the longitudinal axis of the pivot shaft, an elastic bushing surrounding the pivot shaft and positioned between the pivot shaft and the joint member for absorbing vibrations, said bearing being secured to the floor frame vibrations, said bearing being secured to the floor frame and said joint member being secured to a bracket on the vehicle body frame, wherein each of the rear shock absorbing support members is a damping plate shock absorber and comprises a guide shaft joined to a case through an elastic material, said guide shaft having first and second ends, one of the case and the first end of the guide shaft being secured to the vehicle body frame with the other of the case and the first end of the guide shaft being secured to the cabin, the second end of the guide shaft having a damper plate attached thereto, the damper plate being contained in a highly viscous fluid in a fluid enclosing chamber in the case, wherein said case is a generally tubular case which is positioned coaxially with said guide shaft, and wherein an exterior surface of said guide shaft is joined to an interior surface of said case by a plurality of concentrically positioned generally tubular rubber cushions with a plurality of concentrically positioned tubular plates interleaved between the tubular rubber cushions such that two cylindrical surfaces of each tubular plate are at least substantially in full contact with confronting surfaces of an adjacent pair of tubular rubber cushions.

24. A structure for supporting a cabin on a vehicle body and for absorbing and dampening vibrations traveling from the vehicle body to the cabin, wherein the cabin has a floor frame and the vehicle body has a vehicle body frame on which the cabin is to be supported, said structure comprising:

a left buffer support member for pivotally coupling a left front portion of the floor frame to the vehicle body frame, a right buffer support member for pivotally coupling a right front portion of the floor frame to the vehicle body frame, a left rear shock absorbing support member for supporting a left rear portion of the floor frame on the vehicle body frame, a right rear shock absorbing support member for supporting a right rear portion of the floor frame on the vehicle body frame, wherein said left and right rear shock absorbing support members are located at positions which are approximately as high as the height of the center of gravity of the cabin, and a shackle bar having a first end connected to the floor frame through a resilient cushion and a second end connected to the vehicle body frame through a resilient cushion so as to limit yawing of the cabin, wherein said shackle bar has first and second ends with an opening through each of said first and second ends, wherein each of the resilient cushions is a tubular bushing having a rubber coating on an exterior surface thereof, each thus coated bushing being concentrically positioned within a respective one of the openings, a bolt extending through one of the bushings to pivotally secure the first end of the shackle bar to the vehicle body frame, and a bolt extending through the other bushing to pivotally secure the second end of the shackle bar to the floor frame.

* * * * *